(12) United States Patent
Ma et al.

(10) Patent No.: US 7,481,485 B2
(45) Date of Patent: Jan. 27, 2009

(54) VEHICLE BODY TO FRAME LOAD ABSORBING STRUCTURE

(75) Inventors: Xiu Juan Ma, Troy, MI (US); Jianrong Pan, Troy, MI (US); Frank J. Daley, Troy, MI (US); Adam S. Kline, Lake Orion, MI (US); Jane H. Sternemann, Davisburg, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 58 days.

(21) Appl. No.: 11/557,523

(22) Filed: Nov. 8, 2006

(65) Prior Publication Data
US 2008/0106119 A1   May 8, 2008

(51) Int. Cl.
*B62D 25/00* (2006.01)
*B62D 21/00* (2006.01)

(52) U.S. Cl. .................. 296/187.12; 296/209

(58) Field of Classification Search ............ 296/187.12, 296/35.1, 204, 203.03, 187.01, 187.03, 203.01, 296/205, 209; 293/135
See application file for complete search history.

(56) References Cited

U.S. PATENT DOCUMENTS

| 6,676,200 | B1 | 1/2004 | Peng |
| 6,758,516 | B1 | 7/2004 | Abramczyk |
| 6,857,692 | B2 * | 2/2005 | Cardimen et al. ........... 296/204 |
| 7,216,924 | B2 * | 5/2007 | Li et al. ................. 296/187.12 |
| 2006/0087107 | A1 | 4/2006 | Li |

* cited by examiner

*Primary Examiner*—H Gutman
*Assistant Examiner*—Melissa A Black

(57) ABSTRACT

An apparatus is provided for transferring a side load from a vehicle body rocker structure to a vehicle body frame rail that is spaced laterally away from the rocker structure. The apparatus is an energy absorbing strut that is attached to one of the rocker structure and the frame rail and extends toward the other of the rocker structure and the frame rail and into proximity therewith but spaced therefrom. Accordingly, during normal operating conditions of the vehicle the strut carries no load, but upon side load induced excursion of the rocker structure toward the frame rail, the strut deforms and absorbs energy as it transfers the side load from the rocker structure to the frame rail.

6 Claims, 2 Drawing Sheets

VEHICLE BODY TO FRAME LOAD ABSORBING STRUCTURE

FIELD OF THE INVENTION

The present invention relates to a structure for absorbing side loads from a vehicle body to a vehicle frame.

BACKGROUND OF THE INVENTION

It is known in motor vehicles to have a vehicle body that is mounted on a vehicle frame. The vehicle body includes welded together panels that enclose the occupant compartment. In particular, the vehicle body includes a rocker structure that extends longitudinally, and pillars that extend vertically from the rocker structure to support roof rails and the roof panels. The vehicle body has door openings defined by the rocker structure, the pillars and the roof rail. Doors are hinged to the pillars to close the door openings. The vehicle frame has side rails that extend longitudinally and carry the axles, suspension system, and drive train. The side rails are located inboard of the rocker structure and the vehicle body is attached to the vehicle frame by body mounts.

Modern motor vehicles are designed and tested to comply with certain safety standards pertaining to side impact loading on the vehicle body. During side impact loading there will be deformation of the doors and rocker structures. However, it is desirable to minimize the extent to which the frame side rails would be deformed, for example, in order to reduce repair costs. Thus, it would be desirable to provide new mechanisms for the transfer and absorption of such side loads between the vehicle body and the vehicle frame so that vehicle designers have additional design options for compliance with the applicable standards and to minimize deformation of the frame side rails.

SUMMARY OF THE INVENTION

An apparatus is provided for transferring a side load from a vehicle body rocker structure to a vehicle body frame rail that is spaced laterally away from the rocker structure. The apparatus is an energy absorbing strut that is attached to one of the rocker structure and the frame rail and extends toward the other of the rocker structure and the frame rail and into proximity therewith but spaced therefrom. Accordingly, during normal operating conditions of the vehicle the strut carries no load, but upon side load induced excursion of the rocker structure toward the frame rail, the strut deforms and absorbs energy as it transfers the side load from the rocker structure to the frame rail.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is exemplary in nature and is not intended to limit the invention, its application, or uses.

Figure 1:
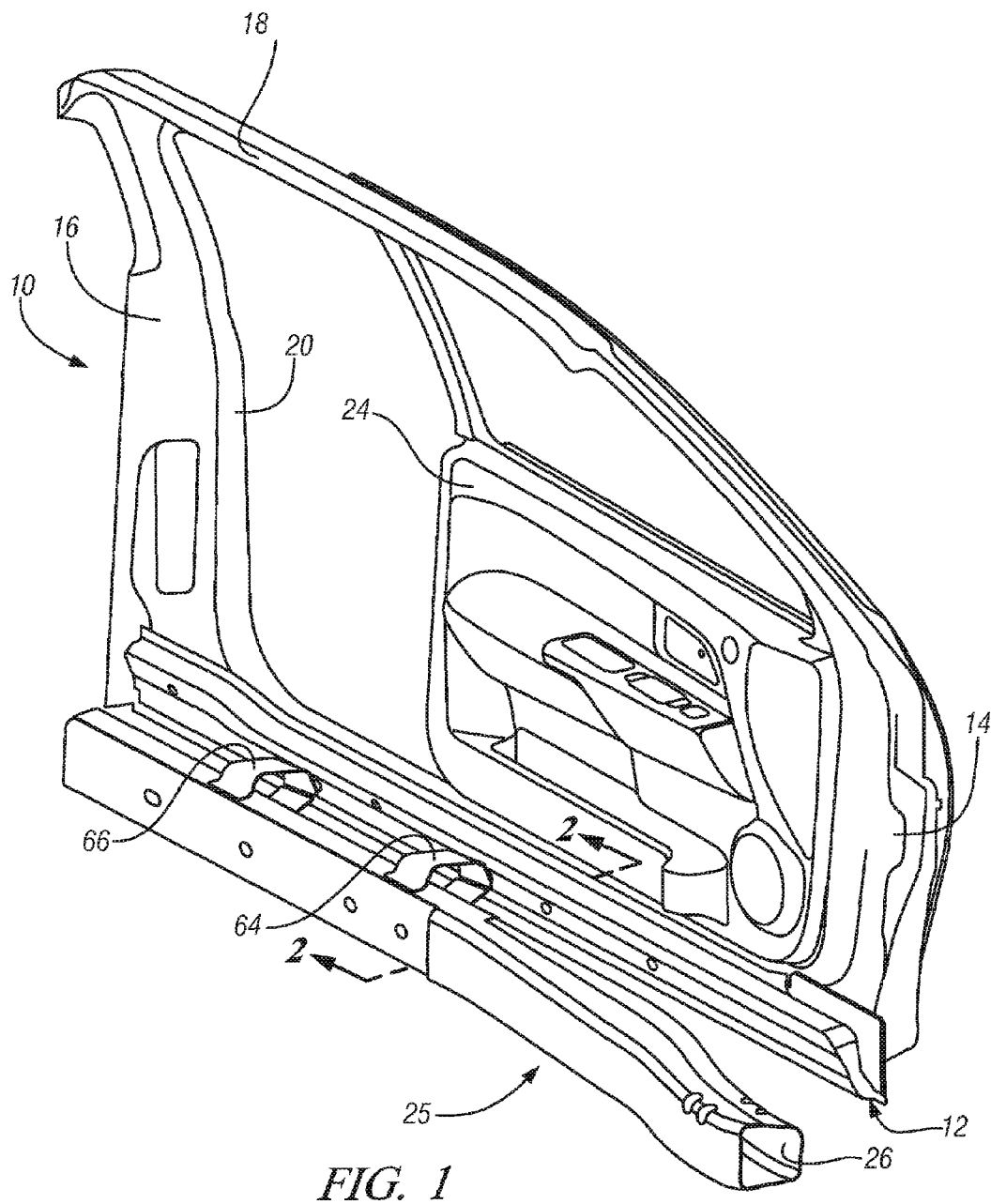
FIG. 1 is a fragmentary perspective view of a vehicle body and a vehicle frame rail and showing an energy absorbing side load transfer device acting between the rocker structure of the vehicle body and the frame rail; and, FIG. 2 is a section view taken in the direction of arrows 2-2 of FIG. 1.

Referring to FIG. 1, it is seen that a motor vehicle body 10 is comprised of welded together sheet panels and includes a longitudinal extending rocker structure 12, a front pillar 14, a rear pillar 16, and a roof rail 18 that cooperate to form a door opening 20. A door 24 is hinged to the front pillar 14 and is movable between an open position and a closed position. A vehicle frame 25 includes a longitudinal extending frame rail 26.

Figure 2:
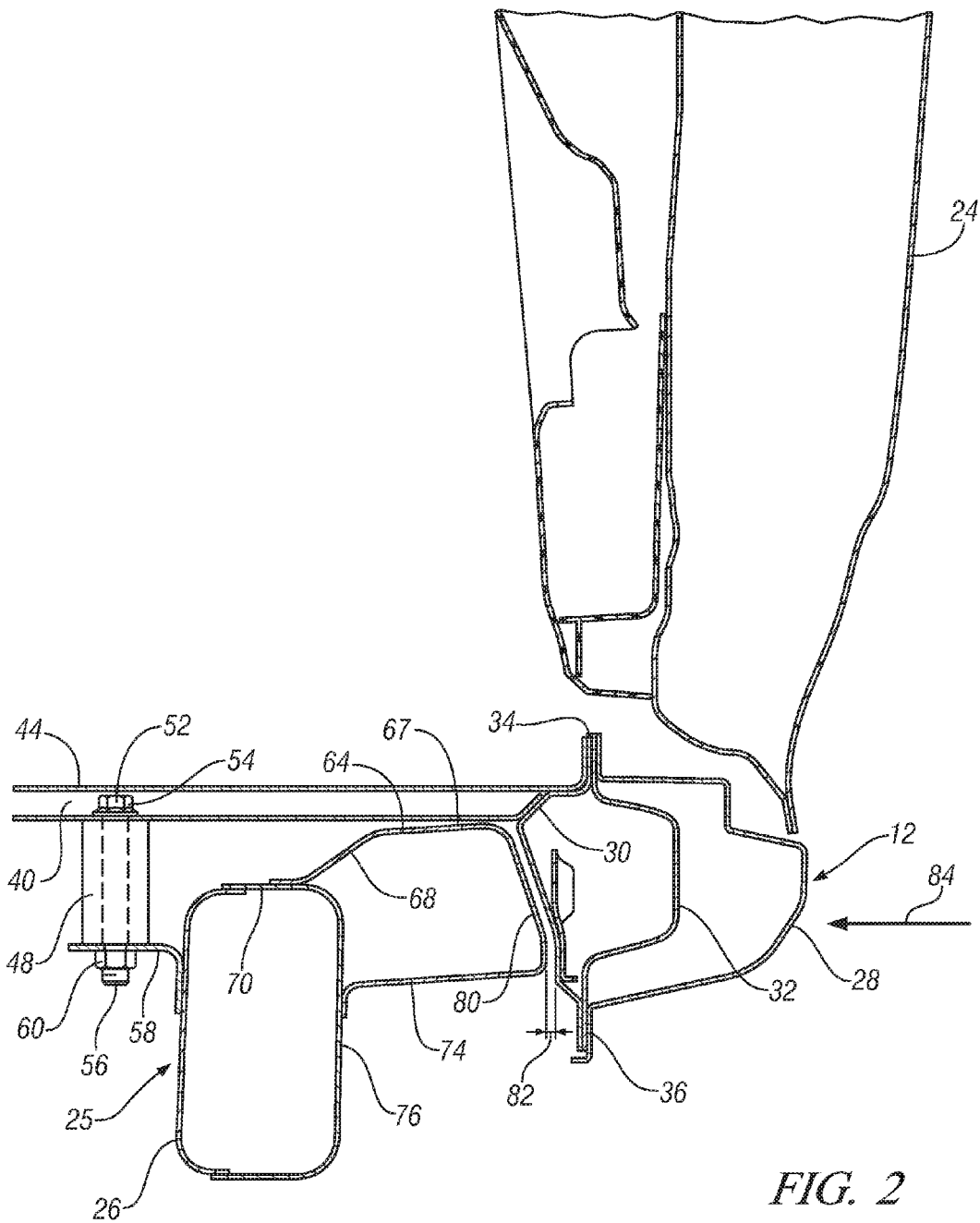

Referring to FIG. 2, it is seen that the rocker structure 12 includes an outer panel 28, inner panel 30 and an interior reinforcement 32 that are welded together at a top seam 34 and bottom seam 36. A cross vehicle beam 40 is welded to the rocker structure 12 and extends to the opposite side of the vehicle body where it is welded to the opposite rocker structure, not shown. The vehicle body has several of these cross vehicle beams and a floor pan panel 44 extends between the rocker structures and between the cross vehicle beams to form a floor for the occupant compartment and to support the vehicle seats.

The frame rail 26 is a box shaped hollow tube and extends longitudinally inboard of the rocker structure 12. The vehicle body 10 is mounted on the vehicle frame 25 by a number of body mounts, one of which is body mount 48 in FIG. 2. The body mount 48 has an upper bolt 52 that is attached to the cross vehicle beam 40 via nut 54, and a lower bolt 56 that attaches to a frame strut 58 via a nut 60. The body mount 48 is conventional in the automotive industry and is an assemblage of metal brackets and elastomeric material that yields somewhat to absorb vibrations and accordingly allows some relative motion between the frame rail 26 and the vehicle body 10. The body mount 48 may be located inboard of the frame rail 26 as shown in FIG. 2, or the body mount 48 may be located outboard of the frame rail 26.

As seen in FIGS. 1 and 2, the frame rail 26 is spaced laterally inboard from the rocker structure 12. As seen in FIG. 1, a pair of struts 64 and 66 is attached to the frame rail 26 and extends into proximity with the rocker structure 12. In particular, as shown in FIG. 2, the strut 64 is a bracket 67 in the form of a hoop of metal including an upper arm 68 welded to the top wall 70 of the frame rail 26 and a lower arm 74 that is welded to the outboard side wall 76 of the frame rail 26. Bracket 67 has a vertical leg 80 that is integral with the upper arm 68 and the lower arm 74, and, as shown in FIG. 2, is spaced a small distance, indicated at 82 in FIG. 2, from the inner panel 30 of the rocker structure 12. This small distance 82 is sufficient to allow the frame rail 26 and the rocker structure 12 to move laterally toward one another during normal relative movement as permitted by the yielding of the body mount 48, and no load is imposed on the bracket 67.

In the event of a substantial excursion of the rocker structure 12 toward the frame rail 26, upon the occurrence of a side impact load imposed in the direction of arrow 84, the rocker structure 12 will begin to deform and move into contact with the bracket 67 so that the side load incurred begins to be transferred from the rocker structure 12 to the frame rail 26. Further excursion will cause the bracket 67 to begin deforming and yielding and the deformation will absorb energy and limit the incursion of the rocker panel toward the frame rail 26, thereby protecting the frame rail 26.

Thus, it is seen that the use of the struts 64 and 66 will effectively transfer the side load and absorb the side load while controlling and minimizing the deformation exposure of the frame rail.

The foregoing description of the invention is merely exemplary in nature and, thus, variations thereof are intended to be within the scope of the invention. The strut 64 can be designed to have a particular stiffness and deformability by choice of the gauge of material used to make the struts, and by use of stiffening ribs or collapse initiators in the design of the struts. In addition, the designer may choose to use more struts or fewer struts, and to select the locations for the struts in order to tune the load transfer and energy absorption characteristics of the vehicle. The struts are thus designed to provide controlled energy absorbing deformation in a way that will minimize and delay the deformation of the frame side rail as the side load is being transferred from the rocker structure 12 to the frame rail 26. Furthermore, it will be understood that the struts 64 and 66 may be attached to the rocker structure 12 and extend to within a small distance of the frame rail 26, rather than being attached to the frame rail 26 and extending toward the rocker structure as shown in the drawings. The struts are not limited to being brackets in the form of a hoop of metal shown in the drawings. Rather the struts may be fashioned of tubes or other structures known in the metal deforming and energy absorbing arts to have the desired characteristics of strength and collapsibility.

What is claimed is:

1. In a vehicle having a vehicle body mounted on a vehicle frame by body mounts that permit a limited range of lateral side to side movement of the body relative to the frame, an apparatus for transferring a side load from a vehicle body rocker structure to a vehicle frame rail that is spaced laterally away from the rocker structure, comprising;

at least one strut attached to the frame rail and extending laterally toward the rocker structure, said strut being a hoop of metal including a first arm and a second arm attached to the frame rail and extending toward the rocker structure and a vertical leg that is integral with the first and second arms and spaced from the rocker structure by a distance greater than the dimension of the limited range of lateral side to side movement between the rocker structure and the frame rail so that only upon side load induced excursion of the rocker structure toward the frame rail is there engagement of the strut with both the rocker structure and the frame rail, said strut being deformed and collapsing during the transfer of the side load from the rocker structure to the frame rail.

2. The apparatus of claim 1 in which the frame rail has a top wall and an outboard side wall, and the upper arm of the strut is attached to the top wall and the lower arm is attached to the outboard side wall.

3. The apparatus of claim 2 in which the strut is mounted on the frame rail by welding.

4. The apparatus of claim 2 in which a plurality of struts are provided along the frame rail.

5. The apparatus of claim 2 in which the frame rail has a top wall and an outboard side wall, and the upper arm of the strut is welded to the top wall and the lower arm is welded to the outboard side wall.

6. In a vehicle having a vehicle body mounted on a vehicle frame by body mounts that permit a limited range of lateral side to side movement of the body relative to the frame, an apparatus for transferring a side load from a vehicle body rocker structure to a vehicle frame rail that is spaced laterally away from the rocker structure, comprising;

said frame rail being a box shaped structure and having a top wall and an outboard side wall;

and a plurality of struts attached to the frame rail and extending laterally toward the rocker structure, each of said struts being a hoop of metal including a first arm welded to the top of the frame rail, a second arm welded to the outboard side wall of the frame rail and extending toward the rocker structure and a vertical leg that is integral with the first and second arms and spaced from the rocker structure by a distance greater than the dimension of the limited range of lateral side to side movement between the rocker structure and the frame rail so that only upon side load induced excursion of the rocker structure toward the frame rail is there engagement of the strut with both the rocker structure and the frame rail, said struts being deformed and collapsing during the transfer of the side load from the rocker structure to the frame rail.

* * * * *